Feb. 10, 1925. 1,526,115
M. J. CARLSON
MEASURING AND INDICATING INSTRUMENTALITIES
Filed July 24, 1922

Maurice J. Carlson,
INVENTOR

BY Victor J. Evans
ATTORNEY

WITNESS: Fred W. Ely

Patented Feb. 10, 1925.

1,526,115

UNITED STATES PATENT OFFICE.

MAURICE J. CARLSON, OF JERSEY CITY, NEW JERSEY.

MEASURING AND INDICATING INSTRUMENTALITIES.

Application filed July 24, 1922. Serial No. 577,124.

*To all whom it may concern:*

Be it known that I, MAURICE J. CARLSON, a citizen of the United States, residing at Jersey City, in the county of Hudson and State of New Jersey, have invented new and useful Improvements in Measuring and Indicating Instrumentalities, of which the following is a specification.

This invention relates to calibrating and indicating devices.

More particularly the invention relates to instrumentalities of dual character embodying means for calibrating the size, diameter or thickness of a thing; and means for indicating the variance between a given size, diameter or thickness and the actual size, diameter or thickness of a thing.

Some of the objects of the present invention are: to combine in a single instrumentality a micrometer-caliper and an indicator; to make provision in an instrumentality of the type just mentioned, so that the micrometer-caliper may be used in the usual manner, and in which the indicator is used by virtue of the movable measuring bar of said micrometer-caliper; to employ means for preventing the movement of said measuring bar to operate said indicator; to use the same standard of measurement for the micrometer-caliper and the indicator; and with these and other objects in view the invention resides in the particular provision, relative disposition and operation of parts hereinafter fully described and illustrated in the accompanying drawing, in which:

Figure 1:
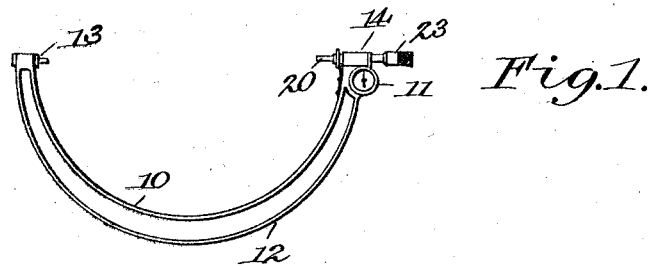
Figure 1 is a side elevation of the instrumentality.
Figures 2, 3:
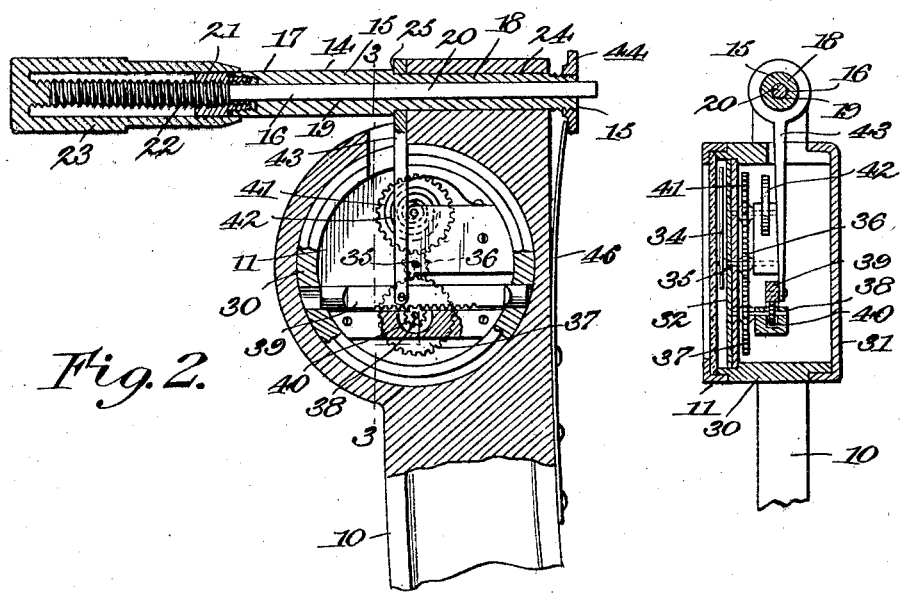
Figure 2 is a longitudinal section through one end of the instrumentality.
Figure 3 is a sectional view taken on the line 3—3, Figure 2.
Figure 4:
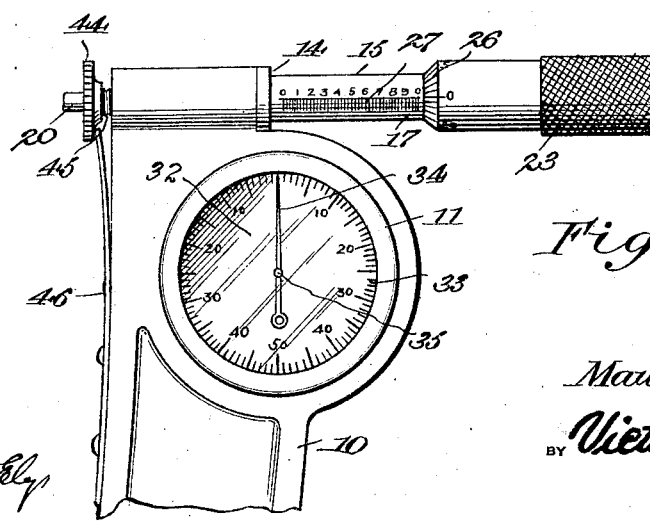
Figure 4 is an enlarged elevation of the end of the instrumentality shown in Figure 2.

Referring now more particularly to the several views of the drawing, it will be apparent that, the instrumentality of the present invention comprises a caliper 10 of the micrometer type and an indicator 11 of a dial and pointer type.

The caliper 10 includes an arcuate part or spanner 12 which has a relatively fixed measuring bar 13 at one of its ends, and the opposite end of the spanner has a micrometer 14 and the indicator 11. The micrometer 14 essentially consists of a measuring bar guide 15 and a measuring bar 16. The guide 15 is of cylindrical parts 17 and 18 and has a bore 19 therein in which the contact spindle 20 of the measuring bar moves. The guide 15 has an adjustable and detachable nut 21 having a screw-threaded portion which screws into a screw-threaded bore in part 17, which nut has a screw threaded bore therein. The spindle 20 has a screw threaded part 22 capable of screw threading action with the screw threaded bore in the nut 21. The spindle 20 is formed integrally or is otherwise attached to a barrel 23 which is sufficiently large in diameter to accommodate the guide 15 thereinto. The spanner 12 has a bore 24 therein which is substantially equal in diameter to the diameter of the part 18 of the guide 15, and the part 18 is freely movable in the bore 24. The part 17 is larger in diameter than the part 18 to provide a shoulder 25. It will now be manifest that the guide 15 is movable relatively to the end of the spanner which carries it, and means is employed for limiting the movement of the guide and also for preventing the movement of the guide by means and for reasons to be set forth hereinafter. The part 23 has inscribed thereon graduations and designations 26, and the part 17 has inscribed thereon graduations and designations 27 for the adjustment of the contact spindle to one-thousandths of an inch, as is usual in micrometers. It should now be manifest that the contact spindle, and in fact the measuring bar 16 has compound movement in that it may rotate and move longitudinally with respect to the guide 15.

Thus far there has been described a micrometer which may be used for calibrating size, diameter or thickness of a thing unattended by any unusual action. The micrometer is set to a particular dimension when the piece of work in hand is tested. The work may be found to vary in size, diameter or thickness as the case may be, but the workmen must "feel" this variance, and the degree of variance must be ascertained by a reading of the gauge. This is not only inconvenient, slow and tedious, but conducive to make the workman guess at his work. For these reasons the indicator 11 is employed.

The indicator 11 includes a case 30 which has a cover 31 frictionally held in place.

The case 30 is carried by the spanner 12. The case 30 has arranged therein a dial 32 having graduations 33 on one face thereof in thousandths of an inch. A pointer 34 is carried at one end of an arbor 35. The arbor 35 has a pinion 36 which meshes with a pinion 37 on an arbor 38. A rack 39 is employed, and the same is mounted for rectilinear movement, and in its normal position one of its ends is confronted by a part of the case 30 to limit its movement in one direction. The teeth of the rack 39 mesh with the teeth of a pinion 40 on the arbor 38. In order to prevent lost motion of these parts of the indicator there is provided a pinion 41 mounted on an arbor, and a convolute spring 42 which has one end thereof fixed and the opposite end thereof attached to a collar or the like on the arbor having the pinion 41.

In order that motion from the moving measuring bar 16 and its guide 15, which at times moves with the bar 16, may be transmitted to the rack 39 and therefore the pointer 34 by virtue of the intervening parts, there is employed a member 43. The member 43 has a hole in one end thereof which accommodates the part 18 of the guide 15, and the said end of the member 43 abuts against the shoulder 25. The case 30 has an opening therein through which the member 43 extends and the inner end of the member is attached to the rack 39.

In order that the guide 15 and its measuring bar 16 may be held against movement so as not to operate the indicator, there is employed a nut 44 or the like which is adapted for screw threading action with the screw threaded end 45 of part 18 of the guide. The nut 44 may be screwed against the spanner end to such an extent as to bring the end of the member 43 also against the opposite side of the spanner end. That in no way interferes with the manipulation of the measuring bar 16 for calibrating operations, but it does prevent the movement of the bar 16 to operate the indicator. By adjusting the nut 44 on the part 18, the guide 15 may be moved within the limits of the adjustment of the nut, by pressure brought against the spindle of the measuring bar 15 to operate the indicator 11, which latter will register the degree of variation in terms of thousandths of an inch. A flat spring 46 is employed with one end attached to the spanner 12 and the opposite end thereof is played against the nut 44. The spring 46 serves to hold the end of the member 43 surrounding the part 18 against the spanner, in which position of the member 43 the pointer 34 registers zero on the dial 32.

It will now be manifest that irrespective of the position of the nut 44 the micrometer 14 may be used in the ordinary manner to calibrate within the range of the device; that by adjusting the nut 44 any variance in size, diameter or thickness of a thing may be seen at a glance on the dial of the indicator 11—the variance being the difference between the reading of the micrometer and the reading of the indicator. Work may thus expeditiously be carried out and with accuracy.

It is to be understood that the right is reserved to make changes and alterations within the scope of the appended claims whenever it is deemed necessary or desirable.

What is claimed is:

1. An instrumentality for calibrating and for indicating variance of size, diameter and thickness of a thing comprising a caliper including a movable measuring bar; an indicator operable by virtue of the movement of said measuring bar, and means preventing the movement of the measuring bar to operate said indicator.

2. An instrumentality for calibrating and for indicating variance of size, diameter and thickness of a thing comprising a caliper, an indicator, and adjustable means for rendering the indicator operatively responsive and inoperatively unresponsive to a movable part of said caliper.

3. An instrumentality for calibrating and for indicating variance of size, diameter or thickness of a thing comprising a caliper including a movable measuring bar; an indicator operable by virtue of the movement of the measuring bar, and adjustable means preventing the movement of the measuring bar to operate said indicator.

4. An instrumentality for calibrating and for indicating variance of size, diameter or thickness of a thing having a spring actuated measuring bar having compound movement, an indicating device operable by virtue of and upon movements of said measuring bar, and means preventing the movement of said measuring bar to operate said indicating device.

5. An instrumentality for calibrating and for indicating variance of size, diameter or thickness of a thing having a spring actuated measuring bar having relatively longitudinal movement, an indicating device operable by virtue of and upon movements of said measuring bar longitudinally, and means for varying the distance of movement of said measuring bar as regards its operation of the indicating device.

6. An instrumentality for calibrating and for indicating variance of size, diameter or thickness of a thing having a spring actuated measuring bar having relatively longitudinal movement, an indicating device operable by virtue of and upon movements of said measuring bar, and means for preventing the movement of said measuring bar to operate said indicating device and for varying the distance of movement of said measuring bar.

7. An instrumentality for calibrating and for indicating variance of size, diameter or thickness of a thing having a measuring bar guide, a measuring bar movable longitudinally of said guide, the said measuring bar and its guide being movable together, an indicating device, and means between the guide and the indicating device for effecting the operation of the latter upon the movement of the former.

8. An instrumentality for calibrating and for indicating variance of size, diameter or thickness of a thing having a relatively longitudinally movable measuring bar guide, a measuring bar movable longitudinally of said guide, the said measuring bar and its guide being movable together, an indicator of the dial and pointer type connected to said guide for operation upon the movement of the guide by virtue of the movement of said measuring bar, and means connected to said guide for preventing the movement thereof to render the indicator inoperative.

9. An instrumentality for calibrating and for indicating variance of size, diameter or thickness of a thing having a relatively longitudinally movable measuring bar guide, a measuring bar movable longitudinally of said guide, an indicator of the dial and pointer type connected to said guide for operation upon the movement of the guide by virtue of the movement of said measuring bar, and means connected to said guide for preventing the movement thereof to render the indicator inoperative and allowing the movement of said guide to render the indicator operative and for varying the distance of movement of said guide.

10. An instrumentality for calibrating and for indicating variance of size, diameter or thickness of a thing having opposed measuring bars, one of said bars being movable relatively to the other bar, a movable guide in which said movable bar moves, a case embodying a dial having a graduated face, a rotatable pointer rotatable with respect to said graduated face, a pinion connected to said pointer, a second pinion meshing with said first pinion, a movable rack meshing with said second pinion, a member connected to said guide and said rack, and means for preventing lost motion between said pinions and said rack.

11. An instrument of the class described having a measuring bar having a combined rotary and longitudinal movement and a sliding longitudinal movement independent of any rotary movement, an indicating device, and means between said measuring bar and said indicating device for effecting operation of the latter upon the independent longitudinal movement of the measuring bar.

12. An instrument of the class described comprising a measuring bar having simultaneous rotary and longitudinal movement and a sliding longitudinal movement independent of any rotary movement, means to limit said independent longitudinal movement, an indicating device, and means between said measuring bar and said indicating device for effecting operation of the latter upon the independent longitudinal movement.

13. An instrument of the class described comprising a measuring bar having simultaneous and combined rotary and longitudinal movement and a sliding longitudinal movement independent of any rotary movement, means to limit the longitudinal movement without in any way interfering with the simultaneous and combined rotary and longitudinal movement, an indicating device, and means between said measuring bar and said indicating device for effecting operation of the latter upon the independent longitudinal movement.

In testimony whereof I hereby affix my signature.

MAURICE J. CARLSON.